United States Patent [19]

Lee

[11] Patent Number: 4,915,365

[45] Date of Patent: Apr. 10, 1990

[54] ELASTOMERIC ENGINE MOUNT WITH HYDRAULIC DAMPING

[75] Inventor: Ping Lee, Kitchener, Canada

[73] Assignee: The Standard Products Company, Cleveland, Ohio

[21] Appl. No.: 93,291

[22] Filed: Sep. 4, 1987

[51] Int. Cl.$^4$ ............................................. F16F 9/10
[52] U.S. Cl. .................... 267/140.1; 180/312; 248/562; 248/636
[58] Field of Search .............. 267/140.5 A, 140.1 R, 267/220; 248/562, 636; 180/300, 312, 902

[56] References Cited

U.S. PATENT DOCUMENTS

| | | | |
|---|---|---|---|
| 4,159,091 | 6/1979 | LeSalver et al. | 267/140.1 X |
| 4,277,056 | 7/1981 | Ticks | 267/140.1 |
| 4,383,679 | 5/1983 | Kakimoto | 267/140.1 X |
| 4,489,921 | 12/1984 | Martin | 267/141.5 |
| 4,573,656 | 3/1986 | Yoshida et al. | 267/35 X |
| 4,583,723 | 4/1986 | Ozawa | 267/140.1 |
| 4,588,173 | 5/1986 | Gold et al. | 267/140.1 |
| 4,621,795 | 11/1986 | Eberhard et al. | 267/140.1 X |
| 4,632,372 | 12/1986 | Nakajima et al. | 267/140.1 |
| 4,679,777 | 7/1987 | Gold et al. | 267/140.1 |
| 4,700,931 | 10/1987 | Eberhard et al. | 267/140.1 X |
| 4,721,288 | 1/1988 | Andra et al. | 267/140.1 X |
| 4,802,658 | 2/1989 | Ushijima et al. | 267/140.1 |

FOREIGN PATENT DOCUMENTS

| | | | |
|---|---|---|---|
| 133588 | 2/1985 | European Pat. Off. | 267/140.1 |
| 228967 | 7/1985 | European Pat. Off. | 267/219 |
| 0178652 | 4/1986 | European Pat. Off. | |
| 3700589 | 7/1987 | Fed. Rep. of Germany | 180/300 |
| 2041485A | 9/1980 | United Kingdom | |
| 2041485 | 9/1980 | United Kingdom | |
| 1583965 | 2/1981 | United Kingdom | |

Primary Examiner—George E. A. Halvosa
Attorney, Agent, or Firm—Harness, Dickey & Pierce

[57] ABSTRACT

A hydraulic mounting device for resiliently supporting an engine on a frame includes a support bracket for attachment to a vehicle frame and a cord insert for attachment to an engine. A first chamber and second chamber is formed therein. A partition separates the first and second chamber. The partition includes a first aperture to allow fluid flow between the first and second chamber. The partition also includes a third chamber formed between the first and second chamber and a second aperture in the third chamber to allow fluid flow between the first and second and third chamber. The third chamber includes a plugh disposed therein for floating in the third chamber and for opening the second aperture in response to high frequency and low amplitude engine movements to allow fluid flow through the second aperture between the first and second chambers and for closing the second aperture in response to low frequency and high amplitude engine movements to prevent fluid flow through the second aperture to allow fluid flow between the first and second chambers solely through the first aperture.

2 Claims, 4 Drawing Sheets

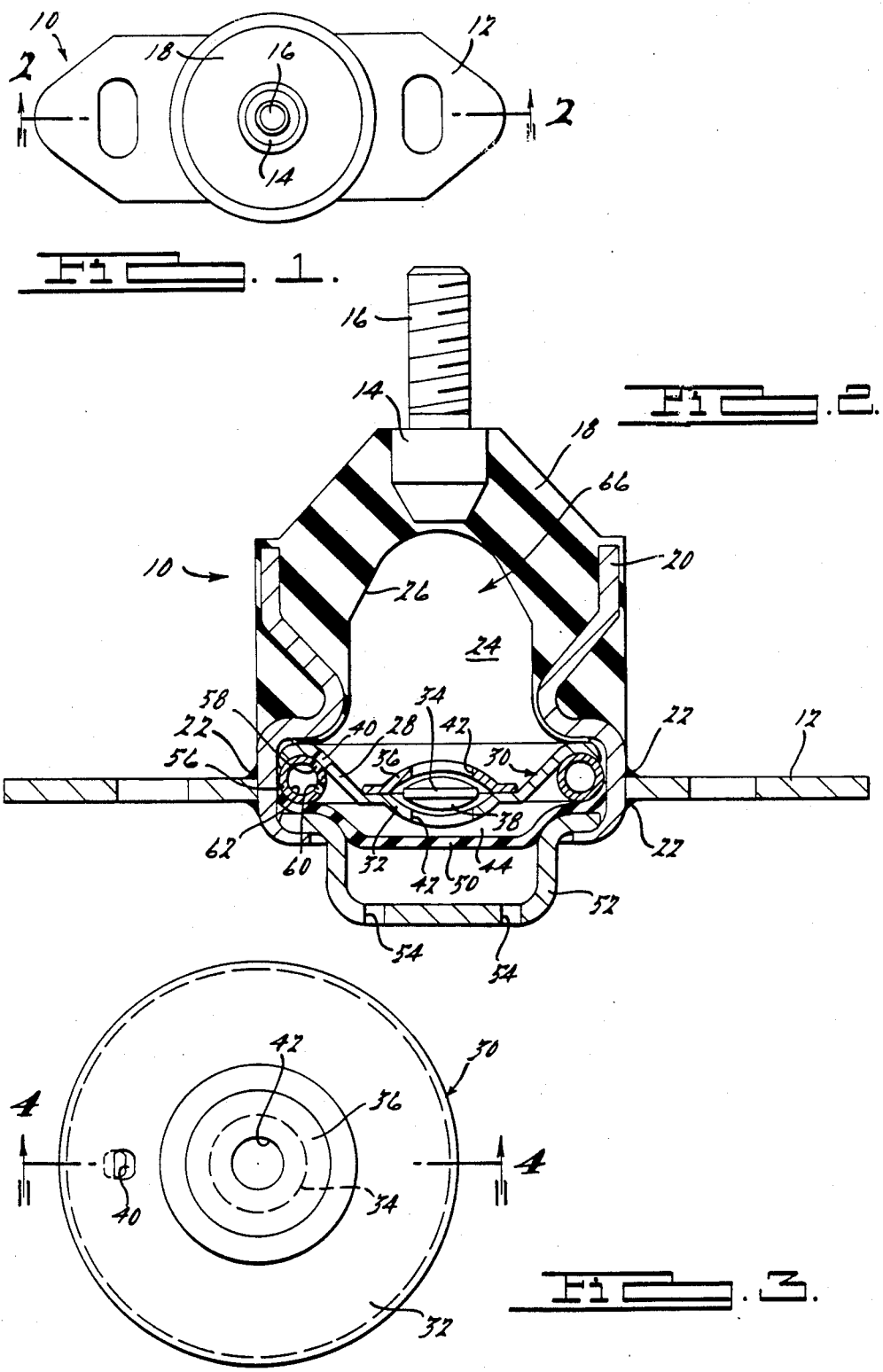

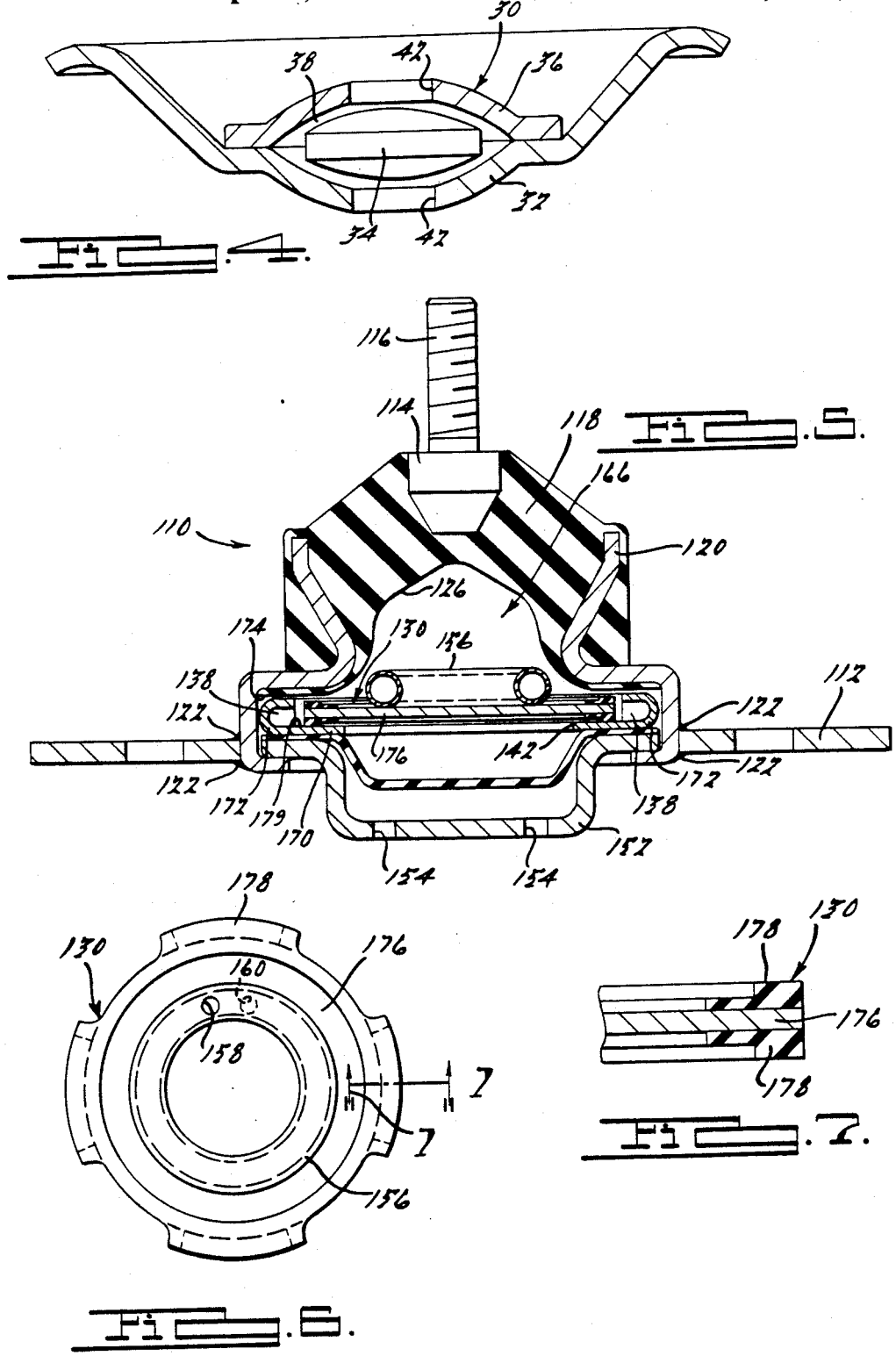

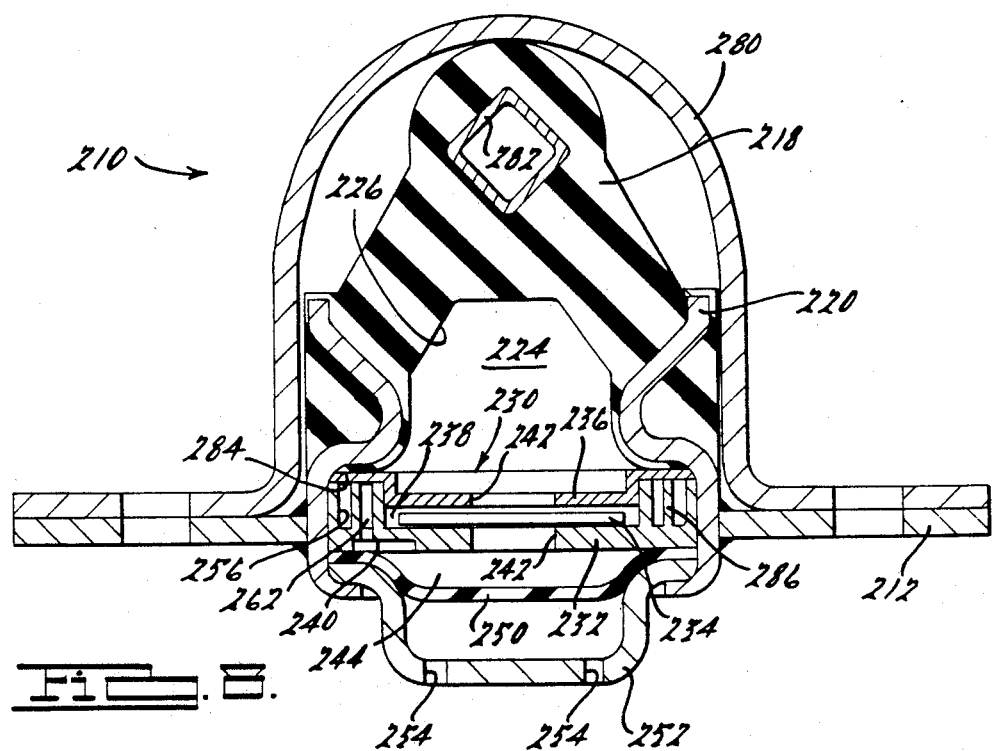

ELASTOMERIC ENGINE MOUNT WITH HYDRAULIC DAMPING

BACKGROUND OF THE INVENTION

The present invention relates to mounting assemblies with damping or shock absorbing characteristics for connecting a vibrating element to a rigid support. More particularly, the present invention relates to an elastomeric mounting assembly with hydraulic damping for supporting or mounting a motor vehicle engine on a motor vehicle frame or other member.

Internal combustion engines and other power plants used to propel vehicles produce various forms of vibrations which are undesirably transmitted to the associated vehicle frame or other supporting structure if not properly dampened. Difficulties arise in properly dampening the vibrations, however, as the vibrations may range from high to low amplitude and high to low frequency depending upon the operating conditions of the engine. An engine mount must be hard and provide high damping where operating conditions give engine bounce and soft with low damping for engine isolation.

One engine mount assembly designed to dampen various forms of engine vibrations is disclosed in U.S. Pat. No. 4,489,921 issued Dec. 25, 1984 to Martin. The Martin patent relates to a resilient engine mount having two elastomeric support means with resistance damping characteristics in order to dampen various forms of engine vibrations whether high or low amplitude or high or low frequency. Another type of mount developed to handle different vibrations is the hydraulic engine mount. For example, U.S. Pat. Nos. 4,159,091 issued June 26, 1979 to Salver, et al.; 4,277,056 issued July 7, 1981 to Ticks; 4,383,679 issued May 17, 1983 to Kakimoto and U.K. patent Application No. 2,041,485A published Sept. 10, 1980 to Ticks disclose various fluid-damped elastomeric mountings for damping vibrations of varying characteristics. However, there still remains a need for an improved engine mount which effectively dampens vibrations of varying frequency and amplitude and, in particular, isolates engine vibration from the frame or other supporting structure and also minimizes engine bounce.

Therefore, in accordance with the present invention, an elastomeric engine mount with hydraulic damping is provided. The engine mount resiliently attaches a vibrating body such as an automotive engine to a vehicle frame or other supporting member. The engine mount has a housing which encloses a pair of chambers which are in selective fluid communication with each other through a valve which operates depending upon the vibration encountered. For low amplitude engine vibration, the valve is open and allows fluid to flow between the chambers. The low amplitude vibrations are elastomerically damped with a low damping effect. For high amplitude vibrations, the valve closes to restrict fluid flow between the two chambers. The high amplitude vibrations are hydraulically dampened by the restricted fluid flow which gives a high damping effect.

BRIEF DESCRIPTION OF THE DRAWINGS

FIG. 4 is a vertical sectional view taken on line 4—4 of FIG. 3;

FIG. 5 is a vertical sectional view of a first alternative embodiment of the present invention;

FIG. 6 is a top plan view of the partition of the first alternative embodiment of FIG. 5;

FIG. 7 is a vertical sectional view, broken away, taken on line 7—7 of FIG. 6;

FIG. 8 is a vertical sectional view of a second alternative embodiment of the present invention;

FIG. 9 is a vertical sectional view of a third alternative embodiment of the present invention;

FIG. 10 is a vertical sectional view of a fourth alternative embodiment of the present invention; and FIG. 11 is a sectional view taken along line 11—11 of FIG. 10.

DETAILED DESCRIPTION OF THE INVENTION

Figure 1:
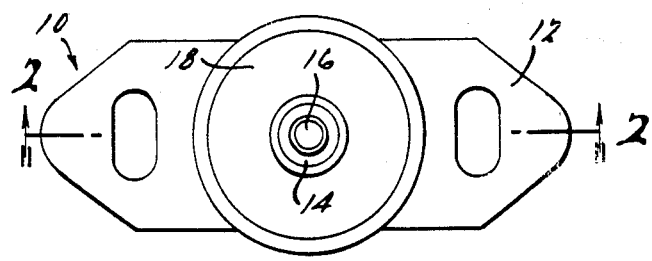
FIG. 1 is a top plan view of a preferred embodiment of the present invention.
Figure 2:
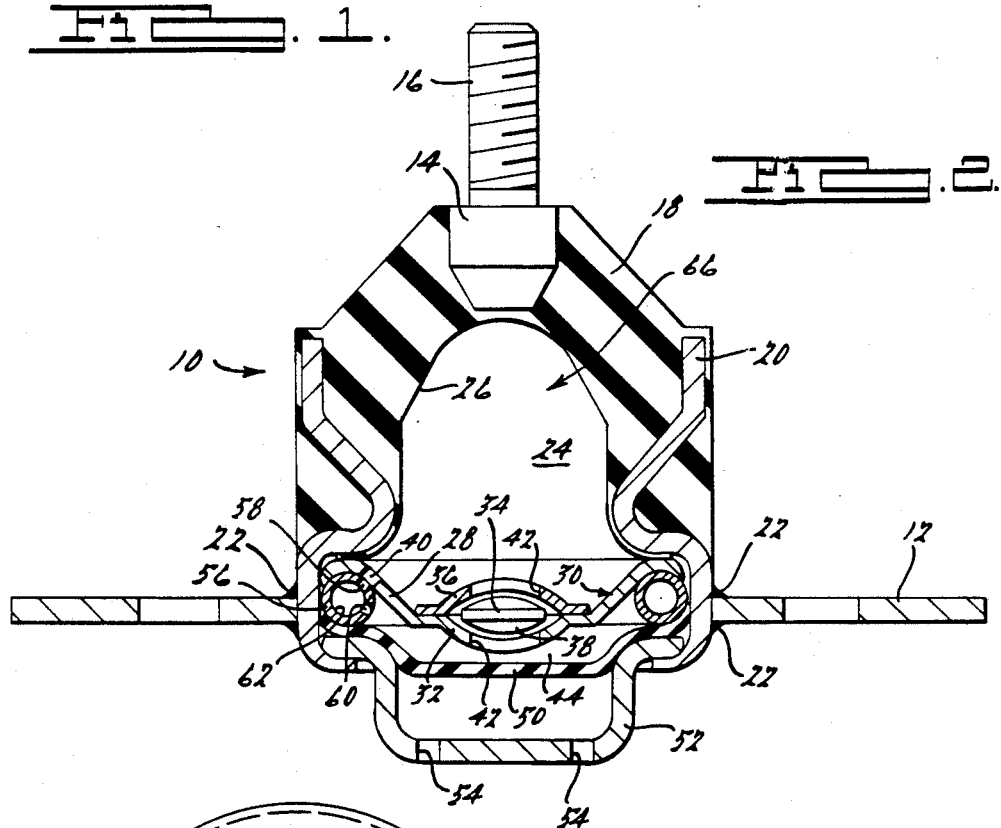
FIG. 2 is a vertical sectional view taken along line 2—2 of FIG. 1.
Figure 3:
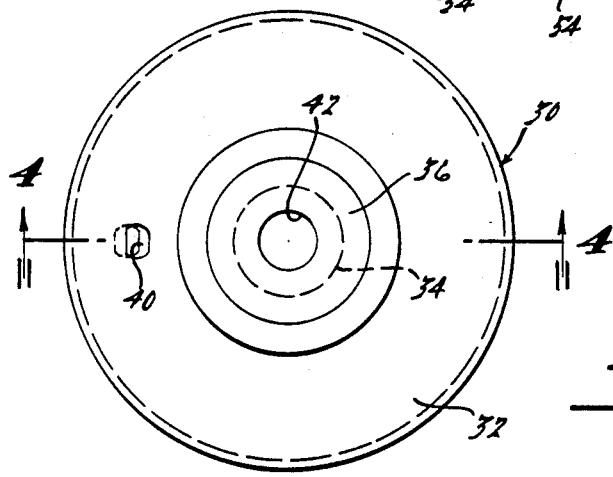
FIG. 3 is a top plan view of the partition of the embodiment of FIG. 1 and 2.

Now referring to the drawings, a preferred embodiment of the present invention is generally shown at 10 in FIGS. 1 through 4. Engine mount 10 includes a support bracket 12 for attachment to a vehicle frame or other vehicle member and a core metal insert 14 with threaded portion 16 for attachment to an engine. It will be appreciated that both bracket 12 and metal insert 14 provide a means of attachment of engine mount 10 to respective vehicle frame and engine in a conventional manner well known in the art.

Engine mount 10 has a top elastomeric support 18 which is generally frusto-conical in shape and interconnects support bracket 12 and core metal insert 14. An upper chamber metal insert 20 is disposed within elastomeric support 18 to strengthen elastomeric support 18. Elastomeric support 18 is bonded to chamber insert 20. Upper chamber metal insert 20 preferably has a curved cross-sectional shape as shown best in FIG. 2 to ensure a strong bond between elastomeric support 18 and upper chamber metal insert 20. Core metal insert 14 is bonded to elastomeric support 18 and support bracket 12 is welded to chamber insert 20 as indicated at welds 22. Thus, the weight of the engine at rest is supported on the vehicle frame by core metal insert 14, elastomeric support 18, upper chamber metal insert 20 and supporting bracket 12.

Engine mount 10 includes an upper or first chamber 24 within a hollow interior portion of elastomeric support 18 and is defined by the interior surface 26 of elastomeric support 18 and upwardly facing surface 28 of a partition generally indicated at 30.

As best shown in FIG. 4, partition 30 has a bottom or first plate 32, floating plug 34 and top or second plate 36. First plate 32 and second plate 36 are preferably made of metal and cooperate to define a valve or third chamber 38 within which is disposed floating plug 34 which may be plastic or rubber. The first plate 32 includes a first aperture or slot 40 to allow fluid flow between the first chamber 24 and a lower or second chamber 44. Third chamber 38 is in fluid communication with first chamber 24 through circle opening or second aperture 42 which provides fluid communication respectively between first chamber 24 and a second chamber 44 and third chamber 38. Second chamber 44 is defined by partition 30 and bellows 50 which comprises a flexible elastomeric material. Bellows 50 is protected by lower chamber or metal cover member 52 which has openings 54 therein. Cover member 52 is connected to the chamber insert and disposed opposite elastomeric support 18.

First chamber 24 is also in fluid communication with second chamber 44 through tubular conduit or channel member 56 which is preferably stainless steel round tubing with slot openings 58 and 60. Channel member 56 is disposed between first plate 32 and bellows 50. Slot opening 58 comprising a third aperture, places the interior or channel 62 in fluid communication with first chamber 24. Slot opening 60 comprising a fourth aperture, places the interior 62 of channel member 56 in fluid communication with second chamber 44.

In constructing engine mount 10, partition 30 is placed between chamber insert 20 and tubular conduit or channel member 56. Bellows 50 is placed between channel member 56 and chamber cover 52. The components are then clamped together by bending the bottom edge of chamber insert 20 radially inwardly. Of course, a suitable liquid medium indicated by number 66, such as antifreeze, water, or the like, is sealed in first chamber 24 and second chamber 44 by bellows 50.

In operation, at high frequencies with small or low amplitude engine movements, floating plug 34 floats in third chamber 38 and apertures 42 are opened so fluid or liquid medium 66 can transfer through apertures 42 and third chamber 38 between first chamber 24 and second chamber 44. The stiffness and damping of engine mount 10 is thus low at high frequency, small or low amplitude vibrational movements.

At low frequency, high amplitude vibration, floating plug 34 is forced upwardly or downwardly to close either of apertures 42, and thus prevent movement of the liquid medium 66 through third chamber 38. Liquid medium 66 can pass through channel member 56 through slot openings 58 and 60 to provide a damping function. The restricted fluid movement through channel member 56 provides a stiff or high damping effect.

Now referring to FIGS 5 through 7, a first alternative embodiment of an engine mount of the present invention is generally shown at 110. Like parts of the preferred embodiment 10 have, like numerals which have been increased by 100. Engine mount 110 is similar in structure to engine mount 10 but has an alternative partition, generally indicated at 130. The partition 130 comprises a first plate 170. The first plate 170 includes "C"-shaped ends 172 disposed between a shoulder 174 of chamber insert 120 and bellow 150. The third chamber 130 is formed between "C"-shaped ends 172 and shoulder 174 of chamber insert 120. A second plate or floating plug 176 is movably disposed within third chamber 138. Second plate 176 includes a sealing portion or gasket member 178 at both ends and on each side of second plate 176 on the interrupted periphery thereof.

In operation, second plate 176 is similar to the floating plug 34 during high frequency and low amplitude engine movements. At low frequency, high amplitude vibration, second plate 176 is forced upwardly or downwardly between shoulder 174 of the chamber insert 120 and upwardly facing surface 179 of first plate 170 to close aperture 142 and thus prevent movement of the liquid medium 166 through third chamber 138. Liquid medium 166 can pass through channel member 156 through slot openings 158 and 160 to provide a damping function.

FIG. 8 illustrates a second alternative embodiment of the present invention, generally shown at 210. Like parts of the preferred embodiment 10 have like numerals which have been increased by 200. Engine mount 210 has an upper chamber elastomeric wall or support 218 which is compressed between an upper or first supporting bracket 280 and a lower or second supporting bracket 212. First supporting bracket 280 and second supporting bracket 212 are spot welded together. The first supporting bracket 280 can also work as a failsafe device when the elastomeric wall 218 completely fractures.

The elastomeric support 218 includes a tubular member 282 having a square tubular cross-section for connection to the engine. The partition 230 includes a first plate 232 and a second plate 236 disposed adjacent first plate 232. First plate 232 and second plate 236 are disposed between shoulder 284 of upper chamber metal insert 220 and bellow 250. The channel member 256 is formed integrally with the end of the first plate 232 and has a "U"-shaped configuration. The second plate 236 closes the open end of the "U"-shaped channel member 256. The channel member 256 includes a plurality of channel formed therein by a dividing wall 286. At least one of the channels 262 communicates with the first aperture 240. The operation of engine mount 210 is similar to engine mount 10.

A third alternate embodiment of the present invention is generally shown at 310 in FIG. 9. Like parts of the preferred embodiment 10 have like numerals which have been increased by 300. Engine mount 310 is also similar to engine mount 210 but substitutes the core metal insert 314 for the tubular member 282 and supporting bracket 280. The channel member 356 includes at least one channel 362 formed therein. The operation of engine mount 310 is similar to that of engine mount 10.

A fourth embodiment of the present invention is generally shown at 410 in FIGS. 10 and 11. Like parts of the preferred embodiment 10 have like numbers which have been increased by 400. Engine mount 410 includes a housing 480 having a rectangular configuration to encase the components therein. The housing 480 is part of the mounting bracket which will be mounted on an engine or a vehicle frame. The chamber insert 420 includes upwardly or outwardly extending flanges 492 having a greater length on one side than on an adjacent side. This arrangement provides enough space for the spool 495 to travel during the vehicle operation and at the same time has the advantages of the stud design; i.e. high bulge stiffness of the upper chamber. The engine mount 410 includes a tubular member 494 and a spool 495 having a square tubular cross-section for connection to the engine. The spool 495 is made of molded nylon and includes a metal insert 496. The metal insert 496 strengthens the nylon to carry the operation loading. During the installation of the engine mount 410, the tubular member 494 can slide in the spool 495 in order to compensate the variation of the distance between the engine and chassis. The elastomeric snubber 497 provides a means to control the side way or lateral travel of the spool 495. The float plate or plug 434 is also made of a rubber material. By changing the stiffness of the plug 434, the peak damping at low frequency can shift and change the dynamic stiffness at high frequency. The rubber plug 434 also produces less noise than one made of metal. The operation of engine mount 410 is similar to that of engine mount 10.

It will be appreciated by those skilled in the art that the foregoing description of the present invention is illustrative in nature and that the present invention is applicable to other vibration isolating devices as well as to engine mounts. While the above description set forth a preferred embodiment of engine mounts of the present invention, it will be appreciated that the present invention is subject to variation and modification. Hence, it is to be understood that various changes, modifications and variations may be made herein without departing from the spirit and scope of the present invention as defined in the following claims.

What is claimed is:

1. A hydraulic mounting device for resiliently supporting an engine on a frame, said device comprising:

attachment means for attachment to a vehicle frame and for attachment to an engine;

first chamber means forming a first chamber;

second chamber means forming a second chamber;

partition means forming a partition between said first and second chamber means;

said partition means including first aperture means forming a first aperture therein to allow fluid flow between said first and second chamber means;

said partition means including a third chamber means forming a third chamber therein between said first and second chamber means;

said partition means including a second aperture means forming a second aperture in said third chamber means to allow fluid flow between said first and second and third chamber means;

said third chamber means including a plug means disposed therein for floating in said third chamber means and for opening said second aperture means in response to high frequency and low amplitude engine movements to allow fluid flow through said second aperture means between said first and second chamber means and for closing said second aperture means in response to low frequency and high amplitude engine movements to prevent fluid flow through said second aperture means to allow fluid flow between said first and second chamber means solely through said first aperture means;

a channel means to communicate with said first aperture means and said second chamber means for allowing fluid flow between said first and second chamber means when said second aperture means is closed;

attachment means comprising a support bracket to be attached to a vehicle frame and core insert having one end threaded for attachment to the engine;

an elastomeric support interconnecting said support bracket and the engine;

said attachment means including a chamber insert disposed within said elastomeric support to strengthen said elastomeric support;

said first chamber means comprising a first chamber formed within said elastomeric support and between said partition means;

a cover member connected to said chamber insert and disposed opposite said elastomeric support;

an elastomeric bellows disposed between said cover member and said partition means;

said second chamber means comprising a second chamber formed between said elastomeric bellows and said partition means;

said partition means comprising a first plate having "C"-shaped ends disposed between said elastomeric support and said elastomeric bellows;

said third chamber means comprising a third chamber formed between said ends of said first plate and between a shoulder on said chamber insert;

said plug means comprising a second plate movably disposed within said third chamber;

said channel means comprising an annular conduit having a circular cross-section and being disposed above and connected to said second plate and having a third aperture to communicate with said first chamber and a fourth aperture to communicate with said second chamber;

said first aperture means comprising a slot formed in said second plate; and a first gasket member formed about the periphery on one side of said second plate and a second gasket member formed about the periphery on the other side of said second plate.

2. A hydraulic mounting device for resiliently supporting an engine on a frame, said device comprising:

attachment means for attachment to a vehicle frame and attachment to an engine;

first chamber means forming a first chamber;

second chamber means forming a second chamber;

partition means forming a partition between said first and second chamber means;

said partition means including first aperture means forming a first aperture therein to allow fluid flow between said first and second chamber means;

said partition means including a third chamber means forming a third chamber therein between said first and second chamber means;

said partition means including a second aperture means forming a second aperture in said third chamber means to allow fluid flow between said first and second and third chamber means;

said third chamber means including a plug means disposed therein for floating in said third chamber means and for opening said second aperture means in response to high frequency and low amplitude engine movements to allow fluid flow through said second aperture means between said first and second chamber means and for closing said second aperture means in response to low frequency and high amplitude engine movements to prevent fluid flow through said second aperture means to allow fluid flow between said first and second chamber means solely through said first aperture means;

channel means to communicate with said first aperture means and said second chamber means for allowing fluid flow between said first and second chamber means when said second aperture means is closed;

said attachment means comprising a support bracket to be attached to a vehicle frame;

said attachment means including an elastomeric support interconnecting said support bracket and the engine;

said attachment means including a chamber insert at least partially encompassing said elastomeric support to strengthen said elastomeric support;

said first chamber means comprising a first chamber formed within said first elastomeric support and between said partition means;

a cover member connected to said chamber insert and disposed opposite said elastomeric support;

an elastomeric bellows disposed between said cover member and said partition means;

said second chamber means comprising a second chamber formed between said bellows and said partition means;

said partition means comprising a first plate and a second plate disposed adjacent said first plate;

said channel means comprising at least one channel formed in the ends between said second plate and said first plate;

said third chamber means comprising a third chamber formed between said first plate and said second plate;

said first aperture means comprising a slot formed in said second plate;

said plug means comprising a plug;

said attachment means including a tubular member communicating through said elastomeric support for attachment to the engine;

said chamber insert including outwardly extending flanges having a greater length on one side than on an adjacent side;

a housing encasing said device and connected to said flanges of greater length of said chamber insert;

said housing having a rectangular configuration; and said plug being comprised of a rubber material.

* * * * *